United States Patent
Le et al.

(10) Patent No.: US 6,407,546 B1
(45) Date of Patent: Jun. 18, 2002

(54) NON-CONTACT TECHNIQUE FOR USING AN EDDY CURRENT PROBE FOR MEASURING THE THICKNESS OF METAL LAYERS DISPOSED ON SEMI-CONDUCTOR WAFER PRODUCTS

(76) Inventors: Cuong Duy Le, 1816 Club Dr., Gilroy, CA (US) 95020; Anh The Ngo, 3330 Shadow Leaf Dr., San Jose, CA (US) 95132

( * ) Notice: Subject to any disclaimer, the term of this patent is extended or adjusted under 35 U.S.C. 154(b) by 0 days.

(21) Appl. No.: 09/545,119

(22) Filed: Apr. 7, 2000

(51) Int. Cl.$^7$ .............................. G01B 7/06; G01R 33/12
(52) U.S. Cl. ...................... 324/230; 324/202; 324/226; 324/716; 324/71.1
(58) Field of Search .................................. 324/228–230, 324/202, 234, 236–243, 225, 691, 525, 650, 71.1, 226, 649, 716

(56) References Cited

U.S. PATENT DOCUMENTS

| | | | | |
|---|---|---|---|---|
| 4,727,322 A | * | 2/1988 | Lonchampt et al. | 324/229 |
| 4,849,694 A | * | 7/1989 | Coates | 324/230 |
| 5,552,704 A | * | 9/1996 | Mallory et al. | 324/233 |

* cited by examiner

Primary Examiner—Jay Patidar
(74) Attorney, Agent, or Firm—Gary L. Eastman; Jeffrey J. Lotspeich (57) ABSTRACT

A method and system for identifying thicknesses of inspection samples, such as semiconductor wafers is presented. The method and system includes a probe housing, comprising an eddy current sense coil and a linear motion controller, and a computer that controls the linear motion controller and the eddy current sense coil. The computer may be configured to identify a thickness of the inspection sample by a method comprising the generation of a natural intercepting curve based on resistance and reactance measurements of at least two data points. Then, a plurality of corresponding resistance and reactance measurements of a location on the inspection sample is obtained with the eddy current sensor, where the eddy current sensor makes a first measurement at a first distance from the inspection sample, and makes each of the remaining plurality of measurements at a distance that is incrementally further away from the inspection surface. Next, an inspection sample curve is generated based on the plurality of corresponding resistance and reactance measurements obtained from the inspection sample. An intersection point between the natural intercepting curve and the inspection sample curve is also generated. A vector impedance for each of the at least two data points, and the intersection point, is calculated to identify a closest two data points that the intersection point is positioned. Then, the thickness of the identified location of the inspection sample is calculated by performing an interpolation between the closest two data points.

17 Claims, 6 Drawing Sheets

NON-CONTACT TECHNIQUE FOR USING AN EDDY CURRENT PROBE FOR MEASURING THE THICKNESS OF METAL LAYERS DISPOSED ON SEMI-CONDUCTOR WAFER PRODUCTS

FIELD OF THE INVENTION

The present invention is directed to a method and apparatus for measuring the thickness and sheet resistance of metal coatings disposed on semiconductor wafer products.

BACKGROUND OF THE INVENTION

As semiconductor wafers increase in size, the costs involved in the production of these wafers also increase. Additionally, the semiconductor industry continues to demand higher yield outputs from manufactured semiconductor wafers, as well as having an ongoing demand for quickly produced, high quality, semiconductor products. As such, there is a continual need for nondestructive testing, conducted either inline during the semiconductor manufacturing process or by way of a standalone unit, to measure and monitor the thickness of metal deposition on semiconductors wafers. Additional need exists for nondestructive testing for semiconductor wafers that have undergone a chemical machining process.

It is well known that an eddy current can be used to measure a material's thickness as well as its conductance, as illustrated in U.S. Pat. No. 4,849,69. In the '694 Patent, a microscope is used to maintain the eddy current probe at repeatable and precise distances above a measured sample. However, this approach is slow and cumbersome for inline production monitoring of metal film thickness of wafers. For example, the focal point location of the microscope is different than the location of the detecting eddy current sensor. As such, even if the microscope can maintain a constant distance above the sample (e.g., wafer), this technique does not provide an eddy current sensor at a constant distance above the measured sample.

Another well known technique for determining the thickness of a semiconductor wafer is illustrated in U.S. Pat. No. 4,727,322. In the '322 Patent, a predetermined value of one component is set and acts as a gate trigger. The wafer's thickness, which is in the range of a calibration curve, can be determined by the value measure at some predetermine value.

Other typical application of an eddy current measurement is described in U.S. Pat. No. 5,552,704. In this Patent, a system is described as being capable of measuring the conductance (e.g., conductivity, resistance, or resistivity) on a sample using an eddy current probe, without the need to measure the separation between the probe and sample. However, in the '704 system, a minimum of 25 data points are needed to generate the lift-off curve of all of the known conductance wafers. The system also generates a calibration curve by pre-selecting a curve to intersect all of the life-off curves. The unknown sample can then be measured by finding the intersecting point between the calibration curve and the unknown sample curve.

Because of the '704 Patent utilizes a pre-selected curve to intersect the known conductance lift-off curves, it does not accurately represent the conductance as a function of conductance. The '704 Patent's method only provides an estimation of unknown conductance when the intersected value is plugged into the conductance function. As such, the pre-selected curve does not represent a true conductance function versus intersecting point.

It is to be further noted that although traditional systems are able to obtain accurate calculations of metal coating thicknesses; however, these systems often utilize methods that destroy the inspected sample. In these types of systems, a standard or electron microscope is utilized to measure the thickness of a wafer's coating after a cross-section has been cut through the coating.

SUMMARY OF THE INVENTION

The present invention is capable of measuring the thickness of metal coatings disposed upon semiconductor wafer products, as well as calculating sheet resistance from a known resistivity constant.

The terms calibration sample and inspection sample will be repeatedly used throughout the specification. The calibration sample term denotes a material sample having a known thickness and resistivity. The calibration sample is utilized during a calibration session to obtain a variety of baseline measurements. The inspection sample term denotes a sample having a material layer where the thickness and sheet resistance are unknown.

The present invention preferably obtains several different thicknesses measurements from a calibration sample that cover the possible range of thicknesses of the inspection sample. Preferably, the present invention includes a single absolute eddy current probe comprised of a probe housing and a spring load. In one embodiment, the eddy current probe housing is mounted in a vertical position, perpendicular to the surface of the measuring surface (i.e., wafer surface). However, the present invention is not so limited and other configurations are possible. For example, in another embodiment, the eddy current probe is mounted in a horizontal position, parallel to the wafer surface.

The present invention utilizes an instrument, such as an eddy current personal computer (PC) card that is configured to operate with a PC having a hard drive and CPU. The PC typically will include the necessary software to support the eddy current PC card and as well as perform the necessary data collection.

During a system calibration session, a calibration sample is measured to produce a set of data values associated with the known thickness of the sample. It is to be understood that the calibration sample (i.e., a sample having a known thickness and resistivity), and the unknown thickness sample (i.e., the inspection sample) comprise identical materials. During the calibration session, the measurement frequency generated is at 10 MHz or higher.

The measuring starting point of the calibration sample is denoted by locus (0,0), which is typically a null point or reference point, and indicates the starting locus of the eddy current signal. In other words, locus (0,0) defines the starting point of data collection of the known (i.e., calibration sample) thickness metal coating on the semiconductor wafer.

At the beginning of the calibration session measuring process, the eddy current probe is placed into contact with the calibration sample. More particularly, the probe is positioned so that an eddy current sense coil contacts the top surface metal coating of the calibration sample.

The present invention utilizes a spring load inside the eddy current probe housing to ensure that the calibration sample and eddy current probe (i.e., eddy current sense coil) remain in contact during the calibration process. This spring load ensures that the eddy current signal readings of the calibration sample are obtained from an absolute fixed distance.

Data obtained from the calibration sample consists of an X voltage value and an Y voltage value for each of the series of data samples taken during the calibration session. The X voltage value represents resistance, while the Y voltage represents reactance. Accordingly, the calibration sample provides a series of voltage data values, (X, Y), which are each associated with a known thickness.

For example, after the calibration session (i.e., a measurement of the known thickness sample) is performed, a series of data points will have been measured (e.g., data points A, B, C, D and E). Each data point (A, B, C, D and E) has an associated (X, Y) thickness value denoting their respective thickness (e.g., 500, 1000, 1500, 1700, 2000 angstroms). That is, data point A corresponds to a thickness of 500 angstroms, while data point E has a corresponding thickness of 2000 angstroms.

Since each data point has a voltage value (i.e., X voltage value representing resistance, Y voltage value representing reactance), as well as an associated thickness value (e.g., 500 angstroms, 1000, angstroms, etc.), one of ordinary skill will recognize that each data point will have associated voltage values as well as identifiable thicknesses. As such, each of the identified thicknesses (e.g., 500, 1000, 1500, 1700, 2000 angstroms) may be associated with a particular voltage value (X, Y).

Once the data points have been measured and the required voltage values have been obtained, additional calculations may be performed to determine an equation that represents the graph created by the generated data. In particular, the (X, Y) voltage values associated with each of the data points A, B, C, D, and E, may be used to find the best fit equation. As such, each of the five data points (A–E) may be plotted based on their respective voltage values. As utilized by the present invention, an appropriate equation may be either a first order or second order equation, such as:

$$Y=aX^2+bX+C$$

The generated, best fit, equation represents the natural thickness intercepting curve and will be utilized to determine an intersecting point between two separate graphs (i.e., the natural thickness intercepting curve and the equation representing the inspection sample).

Once the calibration session has been performed, measurements of an inspection sample may then be performed. During the inspection sample measuring process, several data points, having associated (X, Y) values, are collected along a locus of the inspection sample (i.e., the unknown thickness sample). It is to be realized that in contrast to the calibration session, it is not necessary for the eddy current probe (i.e., the eddy current sense coil) to contact the inspection sample.

At the beginning of the inspection sample measuring process, the first data values, (X, Y), are collected by an eddy current probe that is 75 microns above the surface of the inspection sample (i.e., the unknown thickness sample). As the measuring process progresses, a motion controller retracts the eddy current probe along a vertical axis (Z axis) so that the eddy current sense coil is drawn away from the inspection sample. Thus, the distance between the eddy current probe and the surface of the inspection sample is increased during the measuring process. The retraction of the eddy current probe may be controlled by a computer.

During the inspection sample measuring process, a series of voltage data values (X, Y) will be collected. Typically, a total of 15 voltage data values are obtained during the inspection sample measuring process. The first voltage data value (X, Y) will be obtained when the eddy current sense coil is 75 microns above the surface of the inspection sample. The remaining 14 data values are obtained from distances that are incrementally further away from the inspection sample's surface.

In particular, each of the remaining voltage data values are obtained from a distance of 25 microns from the location where the previous data value was obtained. For example, the first voltage data value is obtained from a distance of 75 microns from the inspection surface; the second voltage data value is obtained from a distance of 100 microns; the third voltage data value is obtained from a distance of 125 microns, etc. As such, it is to be understood that the eddy current probe does not contact the sampling surface.

Similarly to the method described during the calibration session, once 15 voltage data point (X,Y) values have been collected from the inspection sample additional calculations may be performed to determine an equation that represents the graph created by the generated data. In particular, the (X,Y) voltage values associated with each of the 15 data points may be used to generate a best fit equation. In other words, each of the fifteen data points may be plotted based on their respective voltage values. As utilized by the present invention, an appropriate equation may be an equation, such as:

$$Y=mX+B$$

The best fit equation generated from the inspection sample data will be referred to as the inspection sample curve.

Accordingly, at this point, two separate equations will have been determined. Specifically, the natural thickness intercepting curve and the inspection sample curve; the natural thickness interception curve having been determined from data obtained during the calibration session and the inspection sample curve determined from data obtained from the inspection sample measuring process.

The determination of an intersection point (point P) of two equations is the next calculation that may be performed. More particularly, the intersecting point of the natural thickness intercepting curve and the inspection sample curve may be calculated. The intersection point calculation may be performed by utilizing the well known mathematical method of determining an intersection point of two curves by equating the equations that represent the curves.

The result of this calculation reveals the intersecting point, P, of the natural thickness intercepting curve and the inspection sample curve. The terms, P(X,Y) and P will be used, interchangeably, to denote the intersection point of these two equations.

After the intersection point P is found, a vector impedance (Z) for each of the identified (X,Y) voltage values is then calculated. More particularly, a vector impedance is calculated for each of the data points (A–E), as well as for the intersection point P. The variable Z will be used to represent the vector impedance for each of the identified voltage values (X,Y). For clarity, the vector impedance notation will be as follows: Z(A) represents the data point A(X,Y); Z(B) represents the data point B(X,Y), Z(P) represents intersection point P(X,Y), etc. To calculate Z for each of the data points (A–E), and intersection point P, the following equation may be used:

$$z\ (X=\sqrt{(X^2+Y^2)}$$

At this point of processing, the vector impedance Z(A–E), as well as Z(P) are known. By identifying where, among the known thickness points, that the intersection point P is located, the thickness of the inspection sample may be calculated. More specifically, by identifying where Z(P) is located with respect to Z(A–E), the thickness of the inspection sample at a particular point may be identified.

For example, if the intersection point P is located between data points A and B (i.e., Z(A)<Z(P)<Z(B)), then a simple interpolation between A and B will determine the thickness of intersection point P (i.e., the thickness of the inspection sample.

Figure 5:
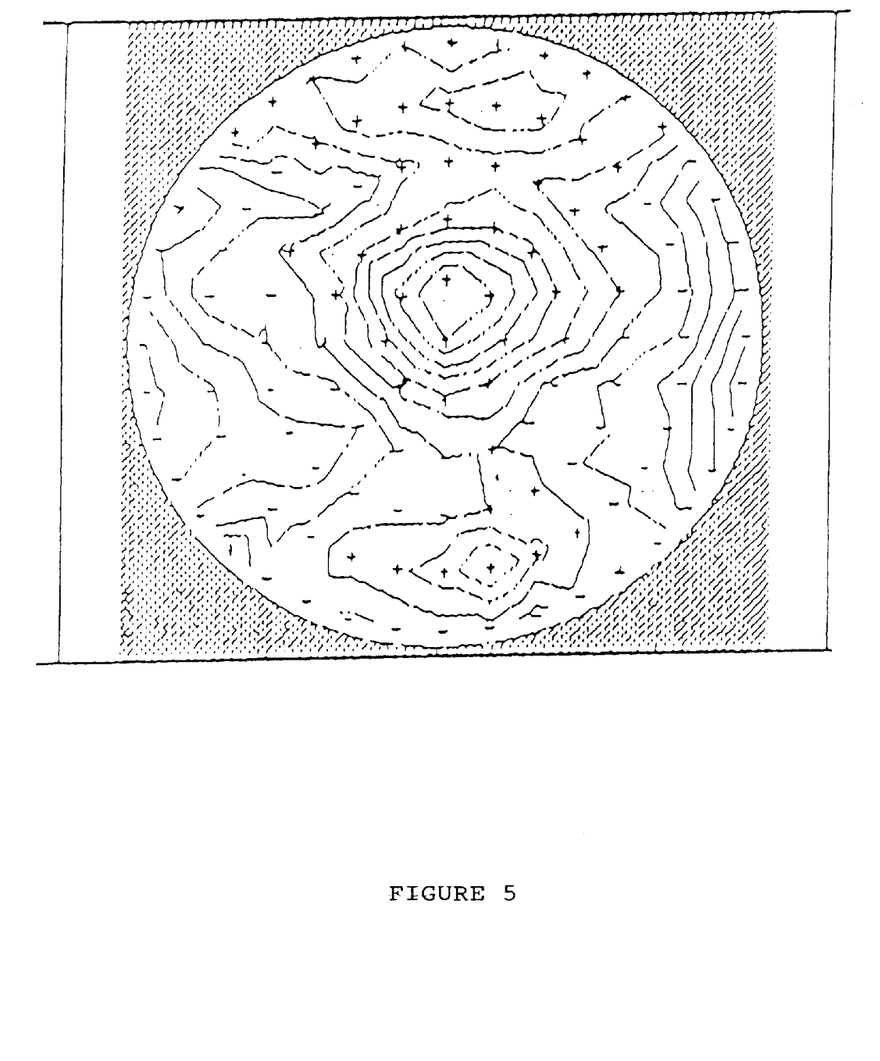
FIG. 5 is an elevation of a contour map obtained by the present invention by measuring specific surface locations of an eight-inch semiconductor wafer.

In situations where a scanning measurement is performed over the diameter of the inspection sample (i.e., a scan across the diameter of a semiconductor wafer), a display may be utilized to represent a cross-section of the thickness profile of the inspection sample. An example of a contour map with elevation levels that can be generated is shown in FIG. 5.

DETAILED DESCRIPTION OF PREFERRED EMBODIMENT

By way of overview, the first step of the present invention is to conduct a calibration session and gather the necessary data so that a natural intercepting curve equation may be generated. (e.g., by operating processor 9 and storing data in memory 10). The second step is to generate a natural intercepting curve equation by using the second order polynomial best fit method. The third step is to store the generated natural intercepting curve equation in memory 10 for later use (e.g., subsequent measurements of samples having unknown thicknesses).

Another step is to measure an inspection sample and calculate an inspection sample curve. Next, the intersection point of the natural intercepting curve and the inspection sample curve is determined. Then, the intersection point is identified with respect to the data points that comprise the natural intercepting curve. Next, the Z vector impedance of each of the known points (A–E), as well as the intersection point P, is calculated. Next, an interpolation between the two data points (e.g., A and B), which the intersection point P is located, is then performed. The interpolation calculation provides the thickness of the intersection point P (i.e., the thickness of the inspection sample at the point of measurement).

Figure 6:
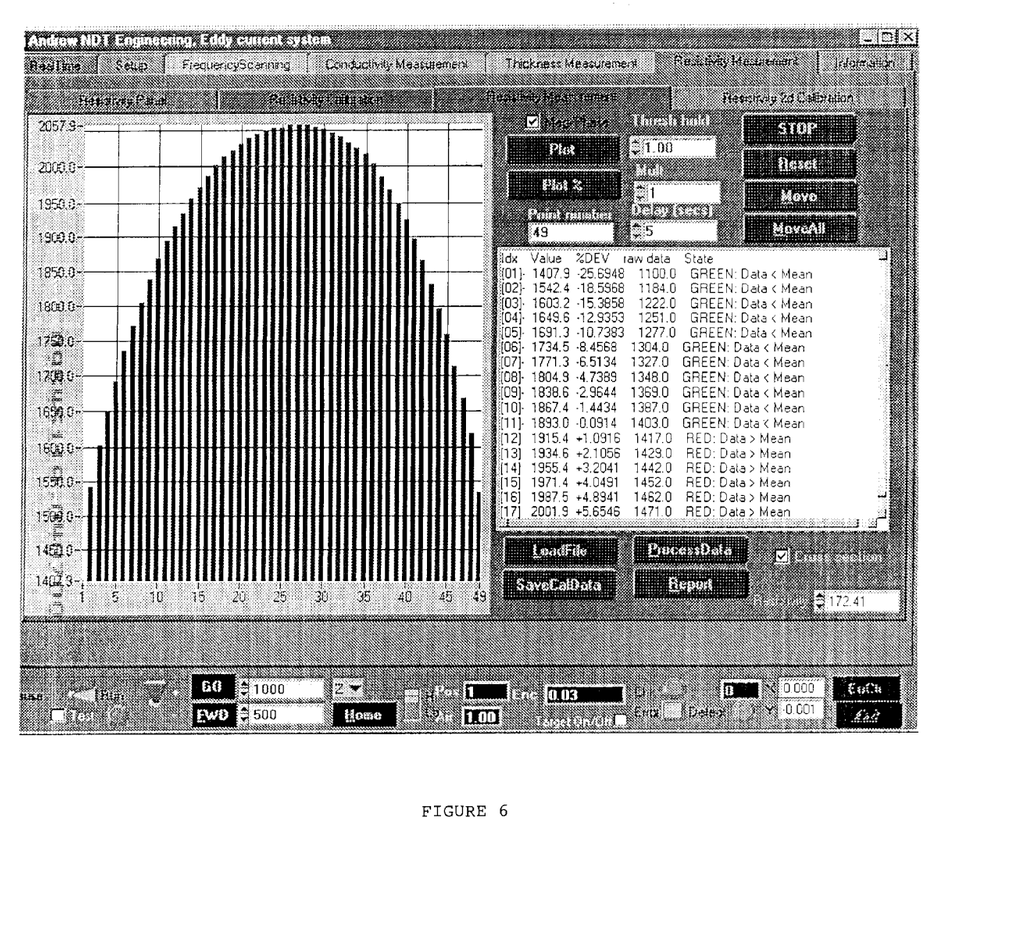
FIG. 6 is a graphical representation of a cross-section thickness of a copper metal layer disposed on an eight-inch semiconductor wafer utilizing 49 measurement points.

By repeating the necessary measurement steps at various portions of a semiconductor wafer, a contour map illustrating the wafer's thickness profile may be created (FIG. 5). Additionally, if 49 points are measured over the diameter of a semiconductor wafer, a thickness profile of a copper metal layer disposed on a semiconductor wafer may be obtained (FIG. 6).

It should also be noted that metal thickness value increases as sheet resistance decreases. This relationship is illustrated by the equation:

$$Ro = (Thickness \times Sheet\ resistance)$$

In this equation, Ro denotes resistivity.

The present invention preferably utilizes a thickness value for calibration rather than utilizing sheet resistance. This is because the present invention utilizes different measurement methods to obtain data from the inspection sample and the calibration sample.

If sheet resistance were to be used for calibration, the sheet resistance would be measured by another, alternative, direct electrical method which can contribute additional error. For instance, sheet resistance value can be obtained by a four-point probe when there is a fixed distance from each point of contact. In this type of configuration, constant voltage and current are applied at the two outside pins of a four-point probe, while voltage drop is measured at the two middle pins. Once the voltage drop is measured, this value, along with the current value, are known. Sheet resistance can then be obtained by a simple equation, such as:

$$V = (I \times R)$$

In this equation, "V" denotes voltage drop, "I" denotes the current, and "R" represents the resistance. This equation represents a simple way to obtain the value of the sheet resistance. However, it is to be realized that sheet resistance measurements comprise many variables and are therefore inherently prone to error. Such errors include the resistance at the point of contact, the reality that voltage cannot be absolutely constant, and a non-planar surface sample, etc.

The term "AC voltage driver" is used throughout the specification to denote the energy used to drive the inductor coil or eddy current probe at a specific frequency. Preferably, a sinusoidal wave is used to obtain the maximum phase separation between the two closest thickness.

Figure 1:
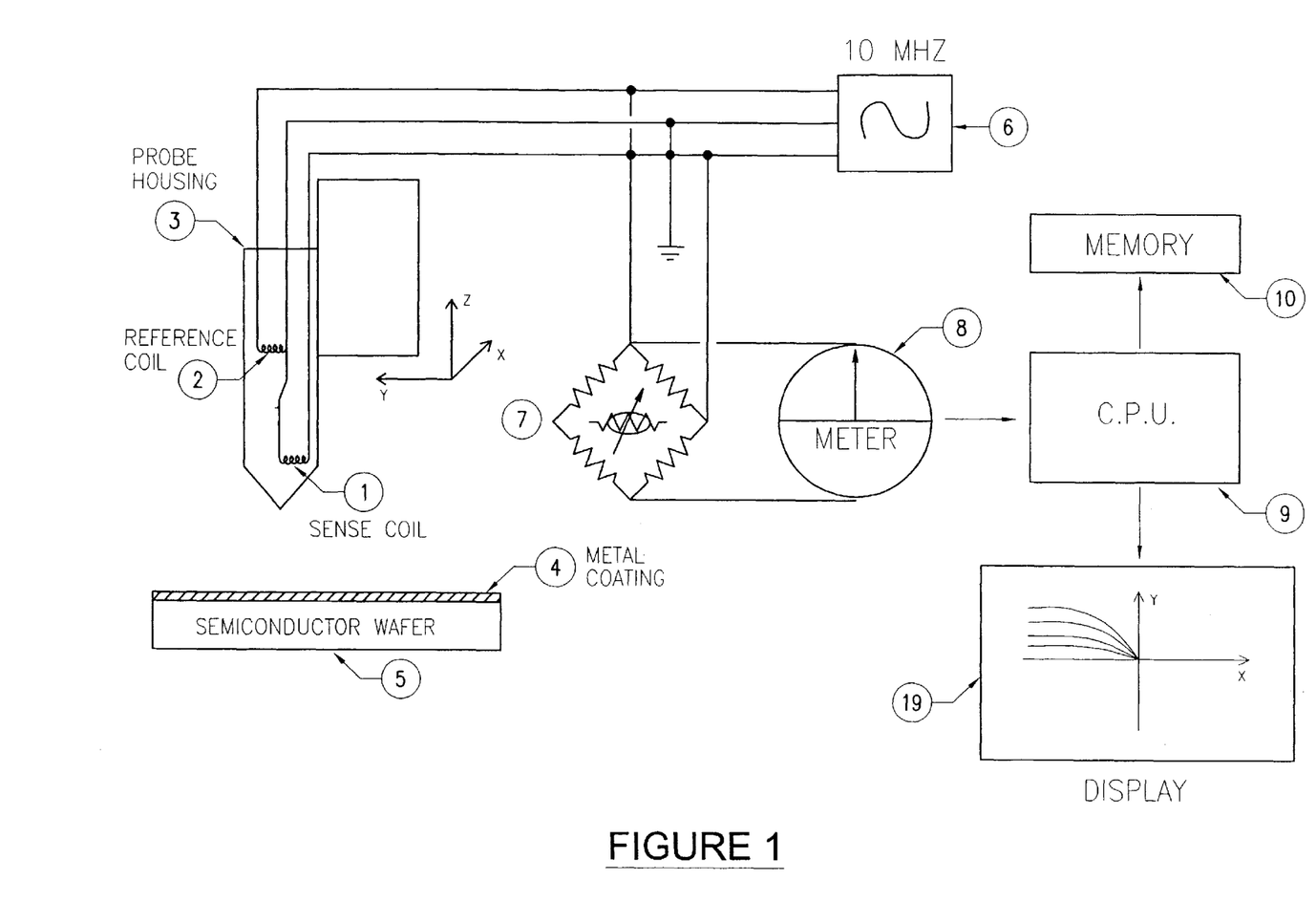
FIG. 1 is a simplified diagram showing a configuration of a preferred embodiment of the present invention.

A preferred embodiment of the present invention will now be described with reference made to FIG. 1. In this Figure, an apparatus is shown having two single absolute eddy current probes. In particular, the apparatus comprises a sense coil 1 mounted at the end of the probe housing 3, and a reference coil 2 mounted within probe housing 3. FIG. 1 illustrates the spatial relationship between the reference coil 2 and the sense coil 1 such that the reference coil 2 is positioned far away from the sense coil 1.

It is to be understood that the sense coil 1 and the reference coil 2 are similarly configured, such that they are both constructed of ferrite core, have the same number of coil turns, and are constructed of a similarly sized magnetic cable (i.e., 42 gauge). Both of the coils (i.e., the sense coil 1 and the reference coil 2) should be fabricated so that the inductance values are equal at 10 MHz frequency response. The resistance of each of the coils must be less than 20 ohms.

In FIG. 1, the vertical axis (axis Z) is normal to the surface of the inspection sample. A vertical axis controller, such as a linear motion controller, provides translation of the probe housing 3. In operation, a vertical axis controller translates the probe housing 3 relative to the inspection sample (i.e., up and down movement).

As required during a calibration session, the probe housing 3 is mounted with a spring load (not shown) to ensure total contact between the sense coil 1 and the calibration thickness sample (e.g., metal coating 4). Because the sense coil 1 is always in contact with the surface of the calibration sample (e.g., metal coating 4) during a calibration session, the need for the optical microscope to have a fixed distance to collect the eddy current signal data at the same height is eliminated.

Preferably, a linear motion controller provides for retraction of the probe housing 3, as required during the inspection sample measuring process. During the inspection sample measuring process, the linear motion controller can position the sense coil 1 very close to the surface of the inspection sample (e.g., metal coating 4) to ensure the maximum magnitude of an eddy current signal without requiring any contact between the sense coil 1 and the inspection sample's surface.

During the measuring process, an AC voltage source 6 is applied to the sense coil 1. The reference coil 2 denotes a voltage driver. Depending on the conductivity of the measured material as well as the material's thickness, the voltage driver 6 may be changed to have the maximum sensitivity of sense coil 1.

A preferable selection of frequency, gain, and voltage drive levels obtain the maximum magnitude signal in response to the eddy current signal, while retaining the ability to determine phase separation at different thickness (e.g., 500 and 505 angstroms). The thickness of the thin layer of a multiple layer sample can be measured by applying multiple frequencies.

In one embodiment, a primary frequency is used to measure the total thickness of a sample having multiple layers, and a secondary frequency may be used to measure the first layer. In this embodiment, the secondary frequency has an even ratio of 2/1, 4/1, or 6/1 so that the first layer can be measured.

FIG. 1 further shows that an AC voltage, with a pre-selected frequency sinusoidal waves at 10 MHz or higher, is induced to a Whitstone Bridge 7. The Whitstone Bridge 7 connects to a sense eddy current coil 1 and a reference coil 2. An adjustable electronic bridge circuit 7A is applied to Whitstone Bridge 7 to balance the Whitstone Bridge circuit to zero the reference voltage.

CALIBRATION SESSION

Figure 2:
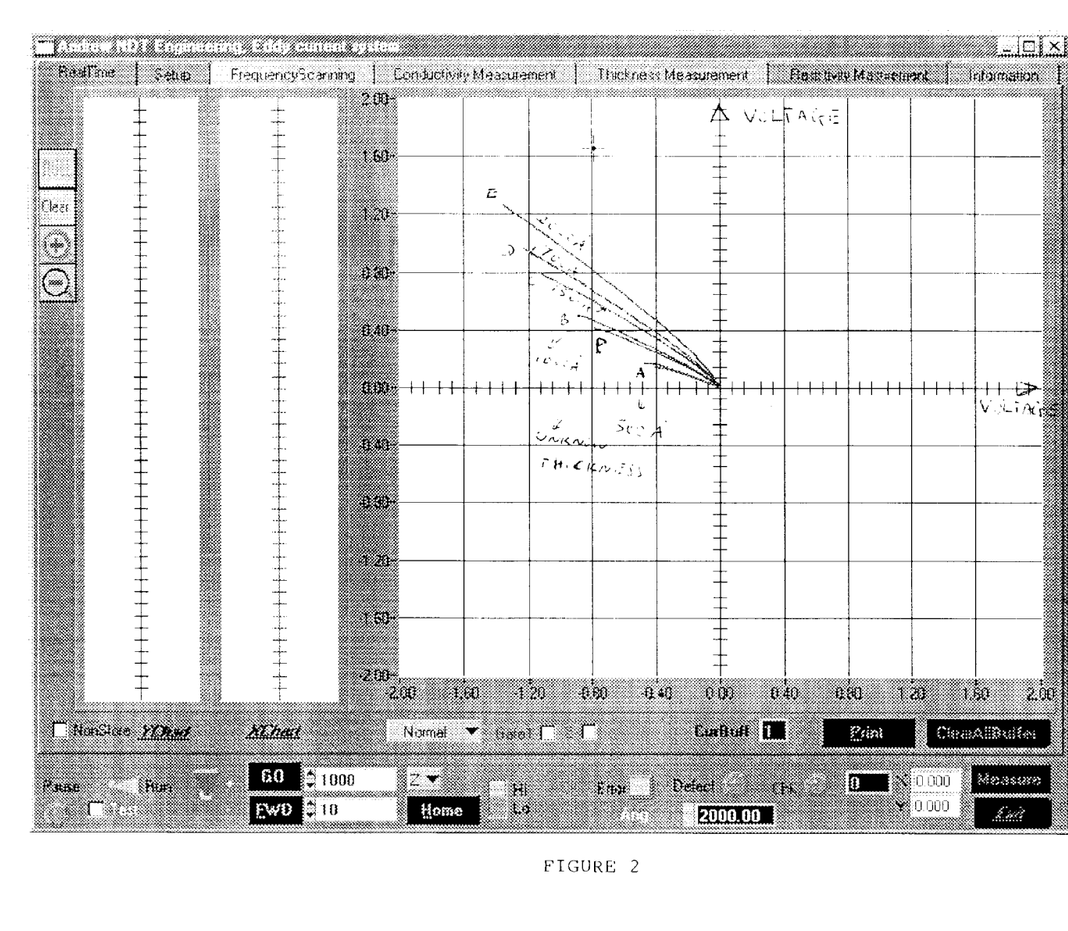
FIG. 2 is a graph of five loci (A,B,C,D, and E) of different known thicknesses, one locus of an unknown thickness inspection sample.

Looking now to FIG. 2, an assortment of voltage level data is presented on a generated grid. As previously discussed, the natural intercepting curve is generated by measuring a number of samples having a known thickness (e.g., data points A–E) during a calibration session.

During the calibration session, the sense eddy current coil 1 is brought into contact with the surface of the calibration sample (e.g., metal coating 4). As noted previously, a spring load ensures contact between the sense coil i and the surface of the calibration sample. A processor (CPU 9) records the X and Y voltage values, and then calculates the amplitude of the impedance vector Z that corresponds to the contacted surface. This calculation is performed by utilizing the previously described formulas.

Looking still to FIG. 2, a graph illustrating the voltage values of five points of a known thickness sample are shown. In particular, the graph of points A, B, C, D, and E are illustrated. Each point of these graphs have X and Y components which are obtained by contacting the surface of the sample with the eddy current sense coil 1.

Once the X and Y values have been calculated for each of the data points (A–E), the Z vector impedance value is calculated for each of the data points (i.e., Z(A–E). Again, Z(A–E) may be calculated by utilizing the previously described formula. The X and Y voltage values for data points A–E, as well as their respective Z vector values, are then stored in memory 10 for later use.

Figure 4:
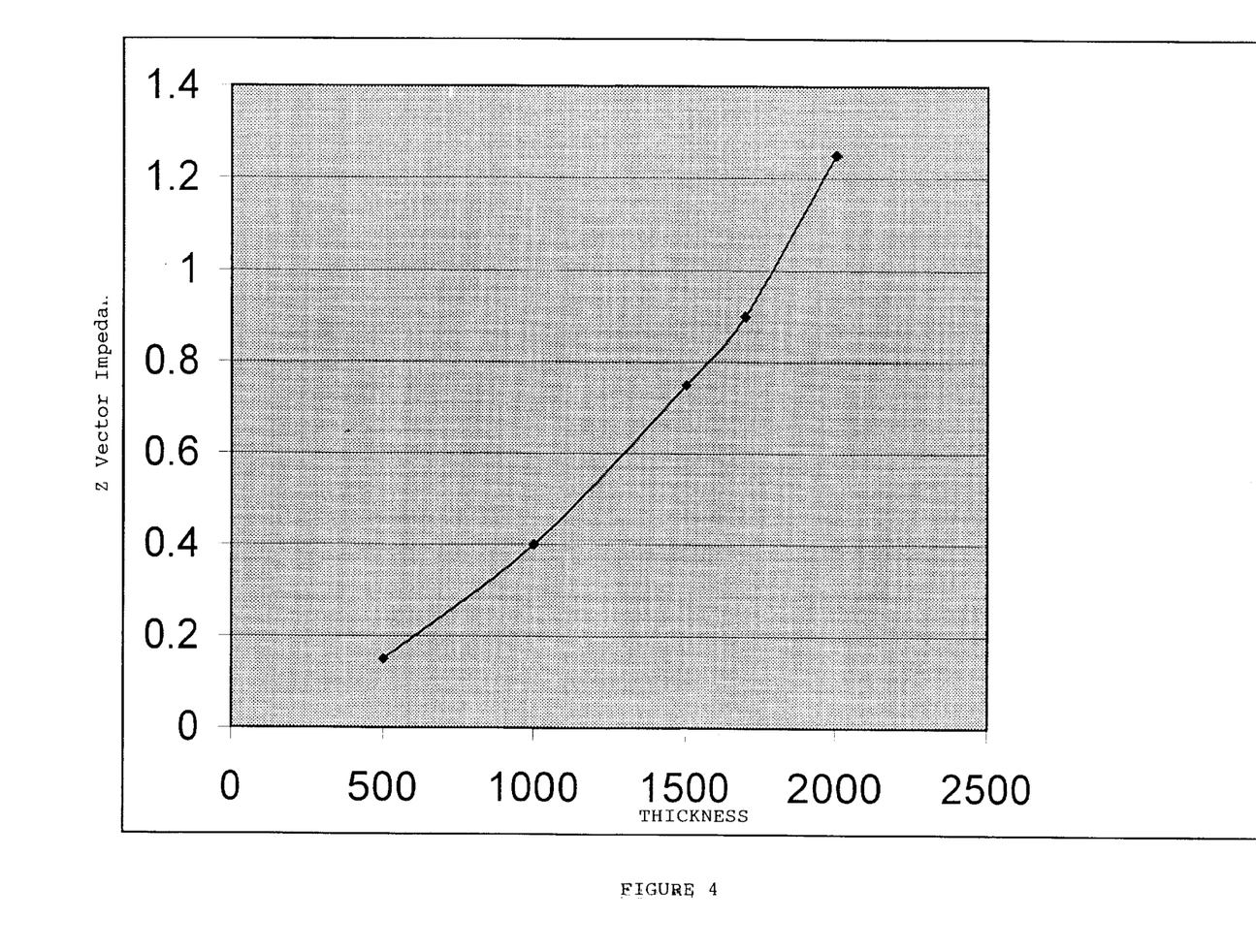
FIG. 4 is a graph showing the natural thickness curve defined by five data points, their respective known thicknesses, and the associated Z vector impedance values.

The coordinates (X,Y) of the five data points of the known thickness sample (i.e., points A, B, C, D, and e) are then used to generate a natural intercepting curve equation by using a second order polynomial best fit procedure (as discussed above). FIG. 4 is a graph showing the natural thickness curve, as defined by the five data points (A–E), as well as their respective known thickness and associated Z values. It is to be understood that these calculations may be performed by utilizing some form of special software. In general form, an appropriate equation will be in the following form:

$$Y = mX^2 + nX + c$$

Thus, the m, n, and c coefficients will be calculated by substituting the previously determined values of the (X,Y) voltage pair into the equation, $Y = mX^2 + nX + c$. Once the necessary calculations have been performed, and the natural intersection curve equation has been generated, measurement of the inspection sample may then be performed.

MEASURE INSPECTION SAMPLE

Inspection sample measurement is initiated by translating the probe housing 3 along the Z axis by a linear motion controller. As the linear motion controller lowers the probe housing 3, the sense eddy current coil 1 approaches contact with the surface of the metal coating 4 of semiconductor wafer 5.

At this point, the Whitstone Bridge 7 has unbalanced voltage between legs, as measured by voltage meter 8. The amplitudes of the in-phase component, as well as the quadrature component, are also measured. This results in the X and Y components shown in the impedance plane display in FIG. 2. Preferably, an A to D board, along with he necessary software, is used to convert the voltage analog signal to a digital signal. The generated digital signal is used to generate data, which is stored on a hard-drive and SRAM (Static Random Access Memory) memory 10 for further processing, calculating and displaying, if necessary.

In one embodiment of the present invention, the sense eddy current coil 1 is moved to a position of 75 microns above the surface of the inspection sample (e.g., metal coating 4).

Typically, 15 data points having (X,Y) voltage values are obtained to generate a good linear equation. Once 15 voltage data point (X,Y) values have been collected from the inspection sample, additional calculations may be performed to determine an equation that represents the graph created by the generated data. In particular, the (X,Y) voltage values associated with each of the 15 data points may be used to find the best fit equation. As utilized by the present invention, an appropriate equation may be an equation, such as:

$$Y(unknown) = aX + b$$

In the above equation, the a and b coefficients will be calculated by substituting the value of the (X,Y) voltage pairs into the equation.

DETERMINE INTERSECTION POINT

Once again, at this stage of processing, two separate equations will have been determined. Specifically, the natural thickness intercepting curve and the inspection sample curve. The next calculation that may be performed is to determine the intersecting point of the natural thickness intercepting curve and the inspection sample curve, which can be found by the following equation:

$$mX^2+nX+c=aX+b$$

The result of this calculation reveals the intersecting point, P, of the natural thickness intercepting curve and the inspection sample curve. Thus, P will be used to denote the intersecting point of these two equations.

It is to be realized that the coefficients, m, n, c, a, and b have previously been calculated, and therefore the X value may easily be found. It is also to be understood that two possible values for X may be present; a positive X value and a negative X value. A negative X value will be used to calculate the Y value in the present invention. However, one of ordinary skill will realize that a positive X value can be used. For example, a positive X value can be used to accommodate the angle rotation of the eddy current signal.

CALCULATE THICKNESS OF INSPECTION SAMPLE

After the intersection point P is found, a vector impedance Z for this point is calculated. It is to be understood that, as described above, a vector impedance (i.e., Z(A–E)) has already been calculated for each of the data points (A–E). Once again, the following equation may be used to calculate Z:

$$Z=\sqrt{(X^2+Y^2)}$$

Thus, at this point of processing, the vector impedance Z(A–E), as well as Z(P) are known. Next, the thickness of the inspection sample may be calculated by identifying where, among the known thickness points, that the intersection point P is located. More specifically, the location of Z(P), with respect to Z(A–E), is identified (e.g., Z(C)<Z(P)<Z(D)), or Z(B)<Z(P)<Z(C)). Lastly, the thickness inspection sample at the measuring site is determined by performing an interpolation between the identified data points having a known thicknesses.

Figure 3:
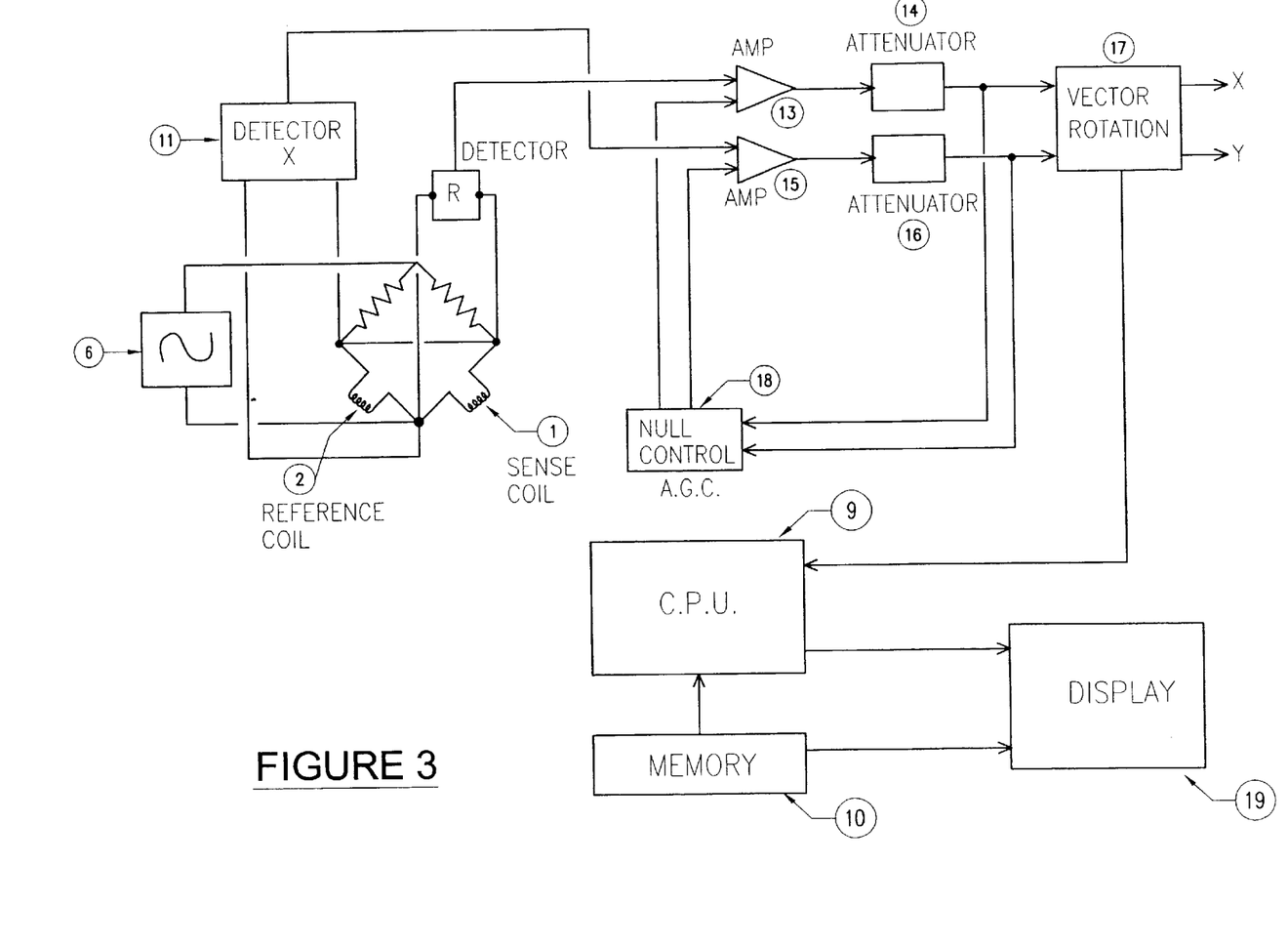
FIG. 3 is a simplified diagram of an alternative embodiment of the present invention.

Looking now to FIG. 3, a modified configuration of the present invention is shown. During operation, as the sense coil 1 approaches the surface of metal coating (not shown in this Figure), a measurement is obtained. In this embodiment, the reactance and resistance are detected by the reactance detector 11 and resistance detector 12. The signal has been amplified to produce optimum levels by utilizing an automatic gain control circuit (ACG), denoted by reference numbers 13, 14, 15, 16, and 18. Further, a vector rotation 17 is utilized to rotate the signal so that an appropriate graphical presentation may be presented at display 19. It is notable that CPU 9 and memory 10 operate in the same manner as the testing circuit shown in FIG. 1.

Looking now to FIG. 5, a contour map having discrete elevations is shown. This example illustrates an assortment of thicknesses of copper plating disposed on the surface of an eight-inch semiconductor wafer. The contour map may be created by performing the necessary measurement steps at various portions of a semiconductor wafer. Additionally, if 49 points are measured over the diameter of a semiconductor wafer, a cross-sectional or thickness profile of a copper metal layer (e.g., metal coating 4) disposed on a semiconductor wafer may be obtained, as shown in FIG. 6.

Various modifications and alternations in the structure and method of operation of this invention will be apparent to those skilled in the art without departing from the scope and spirit of this invention. Although the invention has been described in connection with specific preferred embodiments, it should be understood that the invention as claimed should not be unduly limited to such specific embodiments.

What is claimed is:

1. A method for identifying a thickness of an inspection sample, said method comprising:
   (a) generating a natural intercepting curve based on resistance and reactance measurements of at least two data points;
   (b) obtaining a plurality of corresponding resistance and reactance measurements of a location on said inspection sample with an eddy current sensor, wherein said eddy current sensor makes a first measurement at a first distance from said inspection sample, and makes each of the remaining plurality of measurements at a distance that is incrementally further away from said inspection sample;
   (c) generating an inspection sample curve based on said plurality of corresponding resistance and reactance measurements obtained from said inspection sample;
   (d) determining an intersection point between said natural intercepting curve and said inspection sample curve;
   (e) calculating a vector impedance for each of said at least two data points and for said intersection point, to identify a closest two of said at least two data points that said intersection point is positioned; and
   (f) identifying said thickness of said location by performing an interpolation between said closest two of said at least two data points.

2. The method according to claim 1, wherein at least fifteen corresponding resistance and reactance measurements are obtained of said location on said inspection sample.

3. The method according to claim 2, wherein said first measurement is made while said eddy current sensor is 75 microns from said inspection sample.

4. The method according to claim 3, wherein each of said at least fifteen corresponding resistance and reactance measurements are obtained from a distance of 25 microns further away from said inspection surface than where a previous measurement was made.

5. The method according to claim 4, wherein fifteen corresponding resistance and reactance measurements are obtained of said location on said inspection sample.

6. The method according to claim 1, said method further comprising:
   (g) measuring a plurality of locations on said inspection sample with said eddy current sensor; and
   (h) identifying a thickness of each of said plurality of locations on said inspection sample by performing operations (b) through (f) for each of said plurality of locations.

7. The method according to claim 6, wherein a thickness of forty nine locations on said inspection sample are identified.

8. The method according to claim 1, wherein said natural intercepting curve is generated by a method comprising:
   contacting a surface of an inspection sample, having a known thickness, with an eddy current sensor; and
   measuring five data points of said inspection sample with said eddy current sensor during a calibration session to detect a resistance and a reactance for each of said five data points, wherein said natural intercepting curve is based on said resistance and said reactance measurement of said five data points.

9. The method according to claim 1, wherein said inspection sample comprises a semiconductor wafer having a metal top-layer.

10. A system for identifying a thickness of an inspection sample, said system comprising:
   a probe housing comprising an eddy current sense coil;
   a linear motion controller that translates said eddy current sense coil relative to said inspection sample;
   a computer that controls said linear motion controller and said eddy current sense coil, wherein said computer is configured to identify a thickness of said inspection sample by a method comprising:
   (a) generating a natural intercepting curve based on resistance and reactance measurements of at least two data points;
   (b) obtaining a plurality of corresponding resistance and reactance measurements of a location on said inspection sample with said eddy current sensor, wherein said eddy current sensor makes a first measurement at a first distance from said inspection sample, and makes each of the remaining plurality of measurements at a distance that is incrementally further away from said inspection sample;
   (c) generating an inspection sample curve based on said plurality of corresponding resistance and reactance measurements obtained from said inspection sample;
   (d) determining an intersection point between said natural intercepting curve and said inspection sample curve;
   (e) calculating a vector impedance for each of said at least two data points and for said intersection point to identify a closest two of said at least two data points that said intersection point is positioned; and
   (f) identifying said thickness of said location by performing an interpolation between said closest two of said at least two data points.

11. The system according to claim 10, wherein at least fifteen corresponding resistance and reactance measurements are obtained of said location on said inspection sample.

12. The system according to claim 11, wherein said first measurement is made while said eddy current sensor is 75 microns from said inspection sample.

13. The system according to claim 12, wherein each of said at least fifteen corresponding resistance and reactance measurements are obtained from a distance of 25 microns further away from said inspection surface than where a previous measurement was made.

14. The system according to claim 13, wherein fifteen corresponding resistance and reactance measurements are obtained of said location on said inspection sample.

15. The system according to claim 10, said system further comprising:
   a display unit showing a topographical illustration of said thickness of said inspection sample, wherein said topographical illustration is created by a method comprising:
   (g) measuring a plurality of locations on said inspection sample with said eddy current sensor;
   (h) identifying a thickness of each of said plurality of locations on said inspection sample by performing operations (b) through (f) for each of said plurality of locations; and
   (i) displaying each of said plurality of thicknesses at said display unit to provide said topographical illustration.

16. The system according to claim 15, wherein a thickness of forty nine locations on said inspection sample are identified and subsequently displayed on said display unit.

17. The system according to claim 10, wherein said natural intercepting curve is generated by a method comprising:
   contacting a surface of an inspection sample, having a known thickness, with said eddy current sensor; and
   measuring five data points of said inspection sample with said eddy current sensor during a calibration session to detect a resistance and a reactance for each of said five data points, wherein said natural intercepting curve is based on said resistance and said reactance measurement of said five data points.

* * * * *